April 2, 1968
J. M. CLARK
3,376,366
PROCESS FOR PRODUCING ORGANIC POLYMERIC
FLEXIBLE CELLULAR FOAMED PARTICLES
Filed Dec. 22, 1965
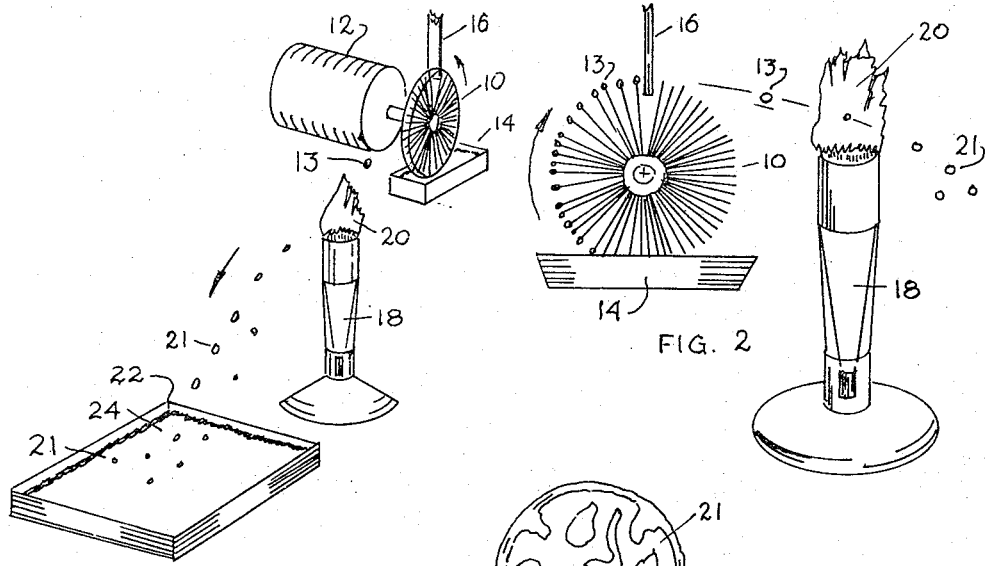
FIG. 1
FIG. 2
FIG. 3
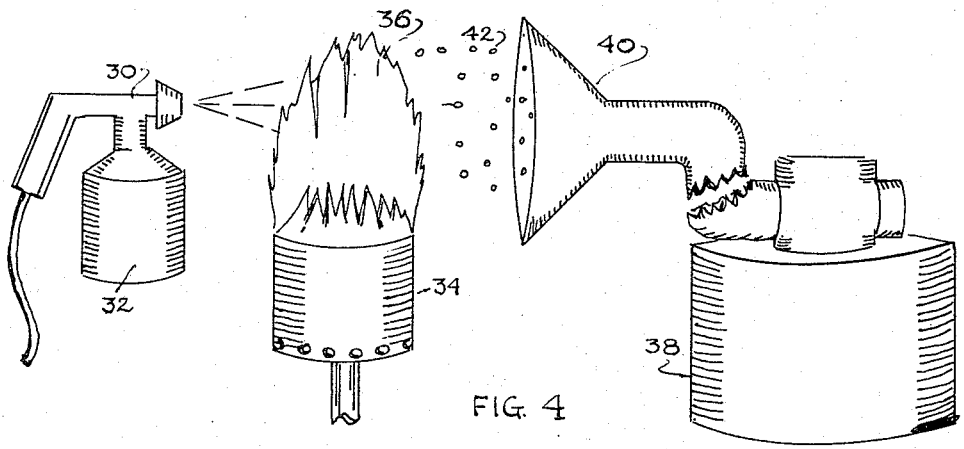
FIG. 4
JOHN M. CLARK   INVENTOR.

3,376,366
PROCESS FOR PRODUCING ORGANIC POLYMERIC FLEXIBLE CELLULAR FOAMED PARTICLES
John M. Clark, 1872 Banbury, Birmingham, Mich. 48010
Filed Oct. 22, 1965, Ser. No. 502,204
7 Claims. (Cl. 264—51)

The present invention relates to the manufacture of small spongy resilient particles from plastisols or similarly constitued materials.

It has been discovered that substantially hollow resilient particles have a number of useful applications. For an example they may be made of colored materials and used in paint to form a textured coating material having a unique appearance. Such a particle containing paint is described in co-pending application Ser. No. 351,565, filed Mar. 12, 1964, entitled, "Foamed Particle Containing Paint," and of which myself and Kenneth B. Hoganson are co-inventors. The particles have a number of other useful purposes for instance, they may be combined to form resilient syntactic foam articles. Seat cushions are an example of an article that may be formed by such a method.

Therefore, it is an object of the present invention to provide for the manufacture of small spongy resilient particles formed from plastisols.

It is another object of the present invention to provide a manufacturing method for producing small spongy resilient particles.

The many objects and advantages of the present invention will be more fully understood by reference to the following description and the accompanying drawings in which:

FIGURE 1 is a schematic sketch of one manufacturing apparatus for producing the particles according to this invention, FIGURE 2 is an elevational sketch of a portion of the apparatus of FIGURE 1, FIGURE 3 is a sectional view of a particle produced according to the method of this invention, and FIGURE 4 is a schematic sketch of an alternate apparatus for producing the spongy resilient particles.

In accordance with the invention, a mixture of the sprayable plastisol and a blowing agent is subdivided into tiny droplets and then propelled through an open flame. The blowing agent gasifies and the plastisol polymerizes so that a small spongy particle is formed with the gas trapped inside. The particles formed by this method are, for the most part, regular spheres, however, a few may be of an irregular shape. All are of a resilient character. The particles may range in size from microscopic to one-eighth inch in diameter. The size depends upon the manufacturing equipment being used and the end uses for the particles being made.

In a specific reduction to practice of this invention, the mixture contained the following ingredients:

40 parts by weight of liquid vinyl plastisol incorporating colored pigments, plasticizers and antioxidants.

1 to 10 parts by weight of "Nitrosan" blowing agent (E. I. du Pont's Explosives Division) as ground at 50% by weight in 50% low viscosity plasticizer. (Nitrosan chemically is N; N'-dimethyl-N-N'-dinitrosoterephthalamide.)

0 to 8 parts by weight of low viscosity plasticizer (such as dodecyl adipate produced by B. F. Goodrich Chemical Company) as required to yield sufficient flow characteristics which should be comparable to the viscosity required for commercial paint sprayers.

The mixture porduced by this formula is used in the manufacturing method described below to produce the spongy particles that are the object of the present invention. It is to be noted that the percentage of blowing agent is not too critical at the upper limit. If there is excess blowing agent it will be burned off in the manufacturing process.

In FIGURE 1, a wire brush wheel 10 is mounted on the shaft of a motor 12. The wheel 10 is adapted to rotate in a counterclockwise direction as seen in FIGURE 1. A pan 14 is disposed beneath the wheel 10 and contains the plastisol mixture described above or one like it. The tips of the wires making up the wheel 10 are immersed in the plastisol mixture. When the wheel 10 is rotated by the motor 12, droplets 13 cling to the tips of the wires.

A knife blade 16 or similar device is mounted to engage the tips of the wires. When the wheel 10 is rotated this causes each individual wire to be momentarily retarded and then to snap back to its normal position after the blade 16 is past. The rapid acceleration of the wire and subsequent deceleration when the individual wire reaches its normal position causes the droplet 13 of plastisol clinging to the wire tip to be propelled in a tangential direction away from the wheel 10.

A Fisher type laboratory gas burner 18 having a flame 20 is positioned adjacent to the wheel 10 so that the propelled droplets 13 of plastisol mixture pass through the flame 20. The momentary high temperature acting upon the droplet causes the blowing agent to gasify forming the droplet into a spongy particle 21. The Nitrosan will gasify at a lower temperature than is required to fuse the vinyl plastisol.

A second pan 22 containing water 24 is positioned at a spot where the spongy particles 21 will fall into it.

In one actual reduction to practice, the resultant small spongy particles 21 were approximately .005 to .020 inch in diameter. They were partially fused on the outside, contained liquid material in the center and generally floated on the surface of the water 24. Since untreated plastisol will sink in water, the fact that the particles 21 floated shows that they contained gaseous material within the fused outer covering.

The floating particles 21 are screened from the surface of the water 24, placed in a container and exposed to a 350° F. temperature in an oven for one minute or more. 350° F. is the temperature that is commonly accepted to fuse or solvate commercial vinyl resins.

The final oven heating of the particles 21 does not affect their size or shape. The blowing agent in the plastisol mixture was thoroughly gasified during its pass through the flame 20. The oven heating merely polymerizes the unfused portion of the plastisol particle 21.

An examination of FIGURE 3 discloses the internal nature of the finished particle. It has a generally irregular internal void caused by the expansion of the blowing agent. The void is irregular because the blowing agent is evenly dispersed through the mixture. The exterior configuration of the particle may also be irregular, although it more commonly has a circular cross section as shown in FIGURE 3.

An alternate apparatus for producing the small spongy particles is illustrated in FIGURE 4. A spray gun 30 suitable for spraying paint, has the plastisol mixture described above placed in the container 32 normally used for containing the paint. A large propane gas weed burner 34 of the type used by farmers to clear fields and the areas around fences is positioned with its flame 36 spaced from the outlet of the spray gun 30. An industrial vacuum cleaner 38 is provided with a funnel shaped inlet 40 on the opposite side of the flame 36 from the spray gun 30.

The spray gun 30 is operated with the plastisol mixture being atomized into a mist and propelled through the flame 36. Due to the heat of the flame 36, the blowing agent in each droplet of the spray mist is gasified. This causes the plastisol droplet to swell up into a small spongy particle. At the same time, the plastisol is partially fused or polymerized. The particles 42 leaving the flame 36 are similar to the particles 21 of the first described embodiment.

The vacuum inlet 40 collects the particles 42 and they come to rest in the bag or receptacle of the vacuum cleaner 38. The water quenching described in connection with the first embodiment is unnecessary because the particles 42 are air cooled by the vacuum cleaner 38. The collected particles 42 are then transferred to an oven 350° F. for a period of one minute or more to complete the fusing of the plastisol in the particles and to expand any residual gas in the particle interior.

If the "residence time" in the flame is insufficient to thoroughly fuse the outer covering of the particle, the subsequent oven heating at 350° F. will cause the particles to adhere together despite the intervening cooling step. While this may be desirable in some cases, for many applications the particles should be individual and separate. To this end, certain aspects of the manufacturing steps should be carefully controlled. To reduce adherence, the velocity at which the droplets are propelled through the open flame should be reduced to increase the residence time in the flame. One advantage of the wire brush method over the paint sprayer method is lower particle velocity.

When the paint sprayer method is to be used, careful selection and adjustment of the equipment is important to obtain correct initial fusing. An airless type sprayer would provide lower droplet velocity and be "softer" than the conventional high pressure gun.

Another way of increasing residence time is to change the angle at which the droplet impinges upon the flame. Rather than have the droplet approach the flame at a 90° angle to the direction of gas flow from the burner, the spray gun may be directed so that the droplets enter the flame almost parallel to the gas flow.

Increasing the temperature of the flame can also assist in improving the fusing if difficulties are encountered.

The small spongy particles produced by either of the described manufacturing methods have many end uses to which they can be put. They may be dispersed in a paint vehicle and used to produce a textured wall covering or coating. They may be fused together with a plastisol "cement" in a mold to produce a syntactic foam article such as a seat cushion.

The foregoing description constitutes the presently preferred embodiments of this invention. Modifications and alterations may occur to those skilled in the art that will come within the scope and spirit of the following claims.

For instance, resins other than the vinyl plastisol mentioned in the cited example may be used as the basis of the foamed particle. Any thermoplastic organic polymer that, in a liquid state, can be formed into droplets is acceptable. For the end uses contemplated for the particles, it is desirable to use a plastisol that provides a resilient end product.

Acceptable blowing agents may be divided into two general classes both of which are operative under the influence of heat. Physical blowing agents may be either gases or liquids that function without chemical change. Chemical blowing agents are normally solid organic or inorganic compounds which decompose at elevated temperatures to yield gaseous products.

I claim:
1. A process for producing organic polymeric flexible cellular foamed particles comprising the steps of making a mixture of blowing agent and liquid plastisol having the consistency of sprayable paint, forming the resulting mixture into tiny droplets and propelling said droplets through an open flame, cooling and collecting said droplets after they pass through said open flame.

2. The method of claim 1 wherein said tiny droplets are formed by expelling said mixture from a spray gun.

3. The method of claim 2 including the further step of heating said collector droplets for a sufficient time and at a sufficient temperature to completely fuse any unfused plastisol in the said droplets.

4. The method of claim 1 wherein said tiny droplets are formed by immersing the ends of the wires of a rotating wire brush wheel in said mixture whereby droplets of said mixture collect on the ends of the said wires, and propelling the droplets from the ends of said wires through said open flame by engaging the periphery of said rotating wheel with a stationary object.

5. The method of claim 4 including the further step of heating said collected droplets for a sufficient time and at a sufficient temperature to completely fuse any unfused plastisol in the said droplets.

6. A process for producing organic polymeric flexible cellular foamed particles comprising the steps of mixing a quantity in the range of 1 to 10 parts by weight of a blowing agent into 40 parts by weight of liquid plastisol containing polyvinyl chloride resin, adding sufficient plasticizer to provide a moderately viscose mixture having the consistency of sprayable paint, forming the resulting mixture into tiny droplets and propelling said droplets through an open flame, said droplets being formed by expelling said mixture from a spray gun, cooling and collecting said droplets after they pass through said open flame, heating said collected droplets to approximately 350° F. in an oven for sufficient time to completely fuse any unfused plastisol in the said droplets.

7. A process for producing organic polymeric flexible cellular foamed particles comprising the steps of mixing a quantity in the range of 1 to 10 parts by weight of blowing agent into 40 parts by weight of liquid plastisol, adding sufficient plasticizer to provide a moderately viscose mixture having the consistency of sprayable paint, forming the resulting mixture into tiny droplets and propelling said droplets through an open flame, cooling and collecting said droplets after they pass through said open flame, heating said collected droplets fo ra sufficient time and at a sufficient temperature to completely fuse any unfused plastisol in the said droplets.

References Cited

UNITED STATES PATENTS

| | | | |
|---|---|---|---|
| 2,576,977 | 12/1951 | Stober | 260—2.5 XR |
| 2,745,141 | 5/1956 | Brennan | 264—80 XR |
| 2,797,201 | 6/1957 | Veatch et al. | 264—54 XR |
| 2,881,141 | 4/1959 | Smythe | 260—2.5 |

FOREIGN PATENTS

| | | |
|---|---|---|
| 7,315 | 8/1910 | Great Britain. |

ALEXANDER H. BRODMERKEL, *Primary Examiner.*

P. E. ANDERSON, *Assistant Examiner.*